United States Patent [19]
Littler et al.

[11] 3,852,460
[45] Dec. 3, 1974

[54] ACID SALTS OF 2-BENZIMIDAZOLECARBAMIC ACID, ALKYL ESTERS AS FUNGICIDES

[76] Inventors: Clarence A. Littler, Rt. 1, Box 727, Sequim, Wash. 98382; Bert Lorin Richards, Jr., 240 Larchwood Rd., Wilmington, Del. 19803

[22] Filed: Nov. 2, 1972

[21] Appl. No.: 303,209

Related U.S. Application Data

[60] Division of Ser. No. 104,485, Jan. 6, 1971, abandoned, which is a continuation-in-part of Ser. No. 52,144, July 2, 1970, abandoned, which is a continuation-in-part of Ser. No. 727,070, May 6, 1968, abandoned, which is a continuation-in-part of Ser. No. 696,694, Jan. 10, 1968, abandoned, which is a continuation-in-part of Ser. No. 629,911, April 11, 1967, abandoned.

[52] U.S. Cl................ 424/273, 260/309.2, 424/175
[51] Int. Cl.............................................. A01n 9/22
[58] Field of Search............... 424/273, 175, DIG. 8; 260/309.2

[56] References Cited
UNITED STATES PATENTS
3,010,968  11/1961  Loux................................ 260/309.2
3,574,845  4/1971  Actor et al........................ 424/273

OTHER PUBLICATIONS
Merck Index, 7th Ed. (1960), p. 832.

*Primary Examiner*—Vincent D. Turner

[57] ABSTRACT

Useful fungicidal compositions are composed of a fungicidal amount of a compound of the formula:

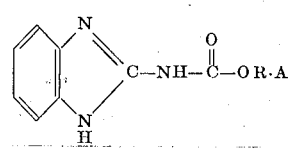

wherein
R is methyl or ethyl and
A is an acid having an ionization constant greater than $1 \times 10^{-6}$. The compounds of this formula can be combined with additional acid having an ionization constant greater than $1 \times 10^{-6}$. The invention also includes the compositions described above combined with certain dispersants or crystallization inhibitors and then neutralized.

5 Claims, No Drawings

ACID SALTS OF 2-BENZIMIDAZOLECARBAMIC ACID, ALKYL ESTERS AS FUNGICIDES

CROSS-REFERENCE TO RELATED APPLICATIONS

This application is a division of our copending application Ser. No. 104,485, filed Jan. 6, 1971 now abandoned which is a continuation-in-part of our copending application Ser. No. 52,144, filed July 2, 1970, now abandoned, which application is a continuation-in-part of our copending application Ser. No. 727,070, filed May 6, 1968, now abandoned, which application is a continuation-in-part of our application Ser. No. 696,694, filed Jan. 10, 1968, now abandoned, which application is a continuation-in-part of our application Ser. No. 629,911, filed Apr. 11, 1967, now abandoned.

BRIEF SUMMARY OF THE INVENTION

This invention relates to the use of the acid salts of alkyl esters of 2-benzimidazolecarbamic acid as the active ingredient of novel fungicidal compositions. The novel compositions are compositions of the acid salts of such esters and mixtures with certain crystallization inhibitors, which compositions have improved solubility and fungicidal activity.

Alkyl esters of 2-benzimidazolecarbamic acid represented by the formula:

(I)
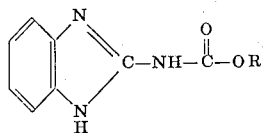

or its tautomeric form:

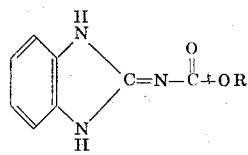

where

R is methyl or ethyl are useful for the protective or curative control of fungus disease on living plants. However, the compounds are quite insoluble in most solvents.

It has now been found that the solubility of these compounds in water, aqueous acetone or in aqueous acids can be enhanced by forming compositions represented by the following formula or its tautomeric form:

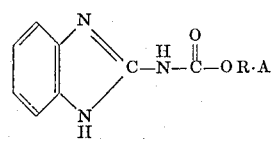

where

R is methyl or ethyl and where A is at least an equivalent quantity of one or more acids having an ionization constant greater than $1 \times 10^{-6}$. These compositions can be prepared and isolated or they may be formed by tank mixing the ester and the acid so that the salt is formed on the foliage as the acid concentrates by evaporation of water. It has further been found that the disease control activity of such compositions is surprisingly greater than the disease control activity of the alkyl esters of 2-benzimidazolecarbamic acid represented by Formula I. The acid salts of the invention can be employed for the curative and preventive treatment of the fungus diseases of living plants while at the same time providing a wide margin of safety to the plants. When used at normal use levels, and even above, there is no significant injury to the plants treated.

The compositions of Formula II can be formed in a number of different ways. The free benzimidazoles of Formula I form isolatable soluble salts with acids having an ionization constant greater than approximately $1 \times 10^{-3}$. However, when such salts are diluted to concentrations suitable for disease control applications, the acidity is not sufficient to maintain such compositions in solution. Additional acid must be added to maintain the pH of the spray slurry below approximately 4 or preferably 3.0 – 3.2. The additional acid may be supplied by mixing with excess liquid or solid acid when the composition is prepared, or by adding the excess acid into the spray tank prior to the addition of the compound of Formula II.

The compositions of Formula II can also be made with weaker acids. Acids with ionization constants as low as $1 \times 10^{-6}$ will react with the compounds of Formula I, either in aqueous or nonaqueous systems. However, in the presence of water there must be an excess of acid above a 1-1 mol ratio of acid to benzimidazole and even then, in dilute acid solution, the reaction is very slow. Liquid acids or those that form liquids with only minor amounts of water readily dissolve the compounds of Formula I, for example glacial acetic acid and 70 percent aqueous glycolic acid will dissolve approximately 10 percent by weight of the parent benzimidazolecarbamic acid, methyl ester. Such solutions can subsequently be diluted with water to a pH of about 3.0 without hydrolysis of the salt and separation of the original benzimidazole.

When the pH of the spray slurry rises above about 3.2 to 4, there is a slow formation of relatively large insoluble crystals of the benzimidazolecarbamic acid compounds of Formula I, and the enhancement of the disease control activity is reduced. So long as the pH is lower than about 4, the formation of the insoluble phase and the consequent loss of activity is sufficiently slow to have no practical significance.

It has now been further found that, surprisingly, when acidic solutions of the compositions of Formula II are mixed with certain dispersing agents, and the pH is then raised, the crystallization described above is inhibited and the material either remains in solution or possibly forms a colloidal suspension still possessing the improved fungus disease control activity.

In another embodiment of the invention, a nonvolatile acid, preferably one having an ionization constant greater than $1 \times 10^{-6}$, can be mixed with the 2-benzimidazolecarbamic acid, alkyl esters, either as a composition or in the spray tank. After application to the locus to be treated, the water evaporates, concentrating the acid and causing formation of the highly active acid salt in situ, for example on the leaves of the treated plants.

DETAILED DESCRIPTION OF THE INVENTION

The 2-benzimidazolecarbamic acid, alkyl esters of

Formula I can be prepared by any of the conventional methods. For example, the esters can be prepared by a three reaction sequence in which, in the first reaction, thiourea is mixed with dimethyl sulfate to produce 2-methylthiopseudourea sulfate in solution. The second reaction consists of the addition to the reaction mixture of an alkyl chloroformate followed by a base to produce an acylated 2-methylthiopseudourea. The last step consists of the addition of a protonic acid and an o-phenylenediamine to produce the benzimidazoles of the formula.

The benzimidazole thus obtained is combined with an acid. The strong mineral acids hydrochloric, sulfuric and nitric acid will react with Formula I compounds in water at a 1-1 mol ratio of acid to benzimidazole to form acid salts which can be isolated as solid, water soluble compounds. These acid salts also have moderate solubility in aqueous acetone. Reaction rate is improved by the use of some excess acid and by heating the reaction mixture. Slightly weaker acids like phosphoric acid exhibit very slow and incomplete reaction under the above conditions but salts may be prepared and isolated in at least two ways.

A volatile strong acid like HCl may be added to a 1-1 mol ratio of benzimidazole and phosphoric acid in water to improve the solution rate. After solution is complete the mix is evaporated to dryness and heated to volatilize the HCl. Alternatively, Formula I compounds may be dissolved directly in 85 percent phosphoric acid with the addition of heat, to form supersaturated solutions which will crystallize out the acid salt upon cooling. Since phosphoric acid is alcohol soluble, it is also possible to carry out the reaction in this medium rather than water.

Acids which have low ionization constants will also form salts with the compounds of Formula I at a 1:1 molar ratio in alcohols. These can, of course, be isolated by evaporating off the alcohol. Such weak acid salts hydrolyze in water unless the pH is held below 4 by the addition of excess acid. However, if such a weak acid salt is slurried in water and sprayed onto the foliage of plants without using sufficient excess acid to hold the pH below 4, some of the salt will reform as the water evaporates and a concentrated acid solution forms on the foliage.

It is apparent to anyone skilled in the art that by selecting an appropriate medium for the reaction, either aqueous or organic and by direct or indirect means, almost any acid with an ionization constant greater than $10^{-6}$ can be made to form an acid adduct with the compounds of Formula I.

After the acid salt has been formed, the formulations of the invention can be prepared by either adding the acid salt to excess acid in solution or by obtaining solid acid salt and formulating it with solid acids or adding to a solution of the acid salt certain surface active agents.

In a preferred embodiment, dilution water is preacidified to a pH of about 3.0 then the acid salt is dissolved therein. The preacidification step can be with any acid capable of producing a pH of 3.0 or less. The acid used can be the same as used to form the salt, or if desired, it can be a different acid. Useful acids include hydrochloric, nitric, sulfuric, tartaric, citric or p-toluenesulfonic acid. The only limitations upon the acids used for this pH adjustment are (1) that a pH of 3.0 can be attained and (2) that the acid be non-phytotoxic at the use level required.

The most practical limiting factor is the acid cost to reach the desired pH.

The amount of acid added should be such that when the composition is at spray concentration, usually 2,000 parts per million active or less, the pH of the spraying solution should be pH 4 or lower and preferably pH 3.2 or lower. If excess acid was used in forming the acid salt, it may not be necessary to add acid at this time. In order to obtain a pH of 3.2 or lower with a minimum weight of acid, the use of stronger acids such as hydrochloric, nitric, and sulfuric is desirable, and the use of hydrochloric acid is preferred.

In the most preferred aspect of the invention a solid acid salt from a strong mineral acid is isolated, then combined with a sufficient amount of an additional solid acid to maintain a low pH at the expected minimum use concentration. This dry powder form minimizes practical problems of packaging and handling.

All solid, acidic agents that will give a pH of 4.0 or below at use concentration, i.e., spray concentration of 500 ppm or less of active, will function effectively in the solid mixtures to maintain the active acid salt free from hydrolysis upon solution. However, practical considerations put some limit on the choice of acid. The final dilute composition must not be toxic to plants or animals, and the amount of additive acid needed to reach the desired pH should be a minimum in order to produce compositions high in active content with minimum cost. Preferred acidic materials include sodium or potassium acid sulfate, toluene-or xylene sulfonic acid, dodecylbenzenesulfonic acid, free acids of complex organic phosphate esters, $Fe(NO_3)_3$, $FeCl_3$ and organic acids like citric, tartaric and maleic. Others which might be used include benzoic, fumaric, lactic, malonic, salicylic or picric acid.

The amounts needed will vary with the acid strength and with the use level of the active pesticide. The lower the concentration of active needed, the higher the ratio of acid to active required to attain the desired pH for making a wettable power. Effective field concentrations of the acid salts are usually from about 0.0010 to 0.2 percent. Higher concentrations may be used for control of soil fungi where it is desirable to spray the material into the row at planting time.

These dry compositions of the invention may also contain other additives common to many wettable powders, such as wetting and dispersing agents, inorganic diluents which act as grinding aids, fluffing and anti-caking agents, or corrosion inhibitors to protect farm equipment. Neutral or acidic additives are preferred, to avoid the need for excessive amounts of added acid. Kaolin clay, attapulgite, and netural fine synthetic silica are examples of suitable diluents. The uses of these conventional additives are illustrated in the examples.

As previously mentioned, in another embodiment, instead of the maintenance of a low pH, precipitation of the 2-benzimidazolecarbamic acid, alkyl esters by hydrolysis of its acid salts at a pH above about 3.2 can be inhibited by the presence in the solution of certain dispersing agents at the time the pH is increased. Best results have been obtained with desugared and partially desulfonated sodium, calcium, and ammonium ligninsulfonates. These are dispersants, rather than wetting agents, emulsifying agents or detergents. Such ligninsulfonates are sub-colloidal polyelectrolyte mixtures which are water soluble but insoluble in non-polar liquids, and which have molecular weights ranging from about 1,000 to about 20,000. With these agents, 250 ppm will hold 150 ppm of the acid salt at a pH 7.5 for at least 24 hours in a non-visible state.

Other dispersing agents such as solutions of methylcellulose and polyvinyl alcohol at the same weight rates also inhibit crystallization, but only for a few hours at best, then turbidity develops. If these solutions are applied to plants before the turbidity develops, they show superior activity but their performance falls below that obtained with the low pH solutions, i.e., the solutions produced with the excess of acid.

In the formulation of a dry mixture, the ratio of the dispersing agent to the active salt will depend upon the minimum active use level intended. For example, minimum use level for many fungi is about 80 ppm. A 1:1 mixture of acid salt and dispersing agent represents a minimum effective level of dispersant. Neutralization must take place after the active and dispersant are completely dissolved. A more generally useful use level of 150–400 ppm active made with this composition will then give 150–400 ppm surfactant.

It is not known whether this is a true solution or the active is in the form of colloidal crystal too fine to produce turbidity.

The biological activity remains as high as with true solutions at low pH.

Suitable methylcelluloses are long-chain cellulosic polymers containing 26 to 33 percent methoxyl groups and whose 2 percent solutions have a viscosity of from 8 to 10,000 centipoise at 20°C. as determined in the Ubbelohde Tube (ASTM pamphlet D 1347-54T) methylcelluloses whose 2 percent solution have a viscosity of 8 – 60 cp. are preferred. Suitable polyvinyl alcohols have a degree of hydrolysis of 88–90 mol percent, and their 4 percent solutions have a viscosity at 29°C. of from 1.8 to 25 centipoise as determined by the Hoeppler falling ball method.

The neutral solutions, protected by dispersing agents, have greatest utility in tank mixes with other agents such as insecticide formulations, which might floc out at low pH.

In another embodiment of the invention, the 2-benzimidazolecarbamic acid, alkyl esters can be mixed with an acid prior to application to the plants that are to be treated. In this embodiment, the compounds should be in very finely divided form, preferably having a particle size, as seen in a microscope, of about 5 microns or less. The acid can be any acid having an ionization constant of $1 \times 10^{-6}$ or greater and should be non-volatile as well as non-injurious to the plants in the amounts to be used. Acids having an ionization constant of $1 \times 10^{-3}$ or greater are preferred. The relative amounts of acid and 2-benzimidazolecarbamic acid, alkyl ester can vary but will usually be in the mole ratio range of from 0.25:1 to 2:1 or even higher. These mixtures can be prepared either as compositions or the compounds can be combined in the spray tank. After application, the spray begins to dry on the foliage or plant due to evaporation of water; at this time some or all of the 2-benzimidazolecarbamic acid, alkyl ester is converted into the highly active form of the acid salt.

As mentioned previously, the compositions of this invention have outstanding fungicidal activity when employed to prevent or mitigate disease damage to plants. They are particularly suited for the treatment of plants such as vegetables, field crops and ornamental or fruit bearing trees. Some of these compositions are also effective when applied directly to the soil for controlling soil born pathogenic plant fungi.

The compositions of this invention can be used to control plant diseases by applying one or more of the active ingredients to the material to be treated for the control of the fungus disease at dosage sufficient to exert the desired action. In application to the foliage of plants, fungus disease control is obtained in most instances by spraying the composition on the plants at a concentration of from 0.0001 to 0.600 percent active ingredient in the spray. The optimum amount within this range is largely dependent upon well-known variables such as the particular active ingredient selected, the method of application, and in the case of application to vegetation, the state and condition of growth of the vegetation to be treated and the climatic conditions. Soil fungi are also controlled by applying the compositions as wettable powders, dusts, pellets or granules to the locus to be protected in fungicidally active amounts. These amounts vary depending on several factors, such as disease pressure, temperature, moisture, fertility, soil compaction, nutrient ratios and other variables. Generally speaking, 0.1 – 100 kg./ha is usually sufficient.

The fungus disease control compositions of the invention can also contain carrier material or conditioning agents of the kind used and commonly referred to in the art as pesticidal adjuvants or modifiers. These conventional adjuvants include inert solids, organic liquid diluents and surface active agents. Usually, from about 1 to 95 percent by weight of the pesticidal composition is active ingredient.

In view of the solubility of the composition of the invention, water is a suitable liquid diluent medium. The active ingredient usually makes up from 0.5 to 50 percent of such aqueous compositions. The aqueous composition can be diluted to a further extent in large quantities of water to obtain application rates in the order of 500 ppm or less as are commonly used with aqueous sprays.

The compositions of the invention can also contain surface active agents of the anionic, cationic or nonionic type. These agents include, for example, sodium oleate, sulfonated petroleum oils, alkylaryl sulfonates, sodium lauryl sulfate, polyethylene oxide modified fatty esters, lignin sulfonates and the like. A detailed list of such agents is set forth in an article by McCutcheon in "Detergents and Emulsifiers," 1966 Annual.

As described in assignee's application Ser. No. 629,914, filed Apr. 11, 1967, now abandoned, higher levels of surfactant relative to the active component often give unusual and unexpected beneficial results.

The compounds of this invention can be mixed with ferric salts such as ferric nitrate and ferric chloride. The resulting materials can be extended more easily with water without precipitation, and also appear to have a beneficial effect on the vigor and coloration of the plants. The materials can also be prepared directly from benzimidazoles plus ferric nitrate or ferric chloride in a suitable solvent system. For example, a product containing excess ferric ion can be made by reacting three moles of ferric nitrate with one mole of 2-benzimidazolecarbamic acid, methyl ester in a methanol-water solvent at 80°C. for about 1 – 2 hours, filtering off the impurities and concentrating to dryness. The ratio of the 2-benzimidazolecarbamic acid ester to the ferric salt can vary from 3:1 to 1:10.

In order that the invention may be better understood, the following examples are offered:

EXAMPLE 1

Preparation of the Hydrochloride 14.64 Parts of concentrated hydrochloric acid (36 percent) is added to 420 parts of water followed by 28 parts of 2-benzimidazolecarbamic acid, methyl ester. The mixture is heated to boiling, whereupon solution is complete. The solution is poured into shallow pans and evaporated to dryness at room temperature in a current of air. The last traces of excess hydrochloric acid are removed by warming at 45°C. Pink-colored, needle-like crystals remain.

The yield is 37.5 parts of crystals of 2-benzimidazolecarbamic acid, methyl ester hydrochloride dihydrate. Analysis of the crystals indicates:

| HCl found - 13.77% | Theoretical - 13.46% |
|---|---|
| $H_2O$ found - 12.3% | Theoretical - 13.7% |

When this product is placed in water, it dissolves rapidly. Following solution, cloudiness develops rapidly and some of the original ester precipitates from solution. If the water is preacidified to a pH of 3 or below, no separation occurs and the solution remains stable.

EXAMPLE 2

Preparation of the Acid Sulfate 5.32 Parts of concentrated sulfuric acid is diluted 1:1 with water, and then pasted with 10 parts of 2-benzimidazolecarbamic acid, methyl ester to obtain wetting of the hydrophobic solid. This paste is then flushed with water into a beaker and volume made up to 600 parts. Upon heating to boiling, complete solution is accomplished. The solution is filtered free of minor impurities and then evaporated at room temperature. Drying is completed at 45°C.

The pink, granular crystals obtained weighed 15.2 parts. The theoretical yield from 10 parts of the ester would be 15.13 parts if unhydrated.

In order to obtain reasonable solution rates, an excess of acid is used. The excess acid in this case is provided by the ionization of the second hydrogen of the sulfuric acid.

When the acid sulfate is placed in water at the rate of 0.06 percent, it dissolves much more slowly than the corresponding hydrochloride, but does not show immediate hydrolysis. However, after 30 minutes crystals can be seen floating on the surface of the water (pH 6.55).

When the acid sulfate is dissolved in water preacidified to pH 2.9, the solution rate is still slow, but no separation occurs even after standing overnight.

EXAMPLE 3

Preparation of the Nitrate 6.68 Parts of 70.5 percent nitric acid is added to 150 parts water and 10 parts of 2-benzimidazolecarbamic acid methyl ester is then added. Solution of the ester is complete at the boiling point. The solution is then filtered free of solid impurities and evaporated in an air stream. White whorls of needle-like crystals are recovered with a yield of 12.87 parts. Theoretical for the anhydrous salt is 13.3 parts. No excess acidity is needed to form the nitrate rapidly. When the nitrate salt is added to water at a rate of 0.06 percent, solution is very rapid but is followed immediately by hydrolysis and precipitation and much of the original ester. When the nitrate is added to water at pH 2.9, solution is complete and permanent.

EXAMPLE 4

Preparation of the Citrate 2.31 parts of citric acid monohydrate and 1.91 parts of 2-benzimidazolecarbamic acid, methyl ester are slurried in 10 parts of absolute ethanol. After about 30 minutes, this slurry becomes very thick. After an elapsed time of 2 hours, the ethanol is evaporated off and 4.21 parts of the acid salt is recovered.

EXAMPLE 5

Preparation of the Salt of the Free Acid of a Complex Organic Phosphate Ester

| | |
|---|---|
| 2-benzimidazolecarbamic acid, methyl ester | 10% |
| glacial acetic acid | 45% |
| the free acid of a complex organic phosphate ester | 45% |

The salt of the acid and the 2-benzimidazolecarbamic acid ester is formed by simple stirring of the above mixture. No attempt is made to isolate the salt. This compound is soluble at 80, 16 and 3.2 ppm upon dilution with water and these solutions have pH values of 3.55, 4.00 and 4.45 respectively.

The solutions are sprayed on greenhouse grown apple seedlings in a preventive test for the control of apple scab, incited by *Venturia inaequalis*. The results are as follows:

| | Percent Disease Control | | |
|---|---|---|---|
| At Active Concentration = | 80 ppm | 16 ppm | 3.2 ppm |
| | 100 | 95 | 40 |

Example 6

| | |
|---|---|
| 2-benzimidazolecarbamic acid, methyl ester, hydrochloride hydrate | 65% |
| tartaric acid | 32.5% |
| low viscosity polyvinyl alcohol | 2.5 |

The polyvinyl alcohol used has a viscosity (4 percent solution) of approximately 5 centipoises, and has a degree of hydrolysis of approximately 88.2 to 89.2 mol percent.

The above composition is mixed and hammer-milled. When dissolved in water at a rate of 0.132 Kg. active per 400 liters, solution is complete and the pH is 3.15. There is no sign of crystal separation upon prolonged standing.

This composition provides excellent preventive and curative control of both apple scab incited by *Venturia inaequalis* and powdery mildew incited by *Podosphaera leucotricha*.

Example 7

| | |
|---|---|
| 2-benzimidazolecarbamic acid, methyl ester acid sulfate | 90% |
| sodium acid sulfate monohydrate | 10% |

The above composition is prepared by mixing 2-benzimidazolecarbamic acid, methyl ester with aqueous sulfuric acid in a 1:1 mol ratio and dissolving in the manner previously described for the preparation of the acid sulfate salt. Prior to evaporation, sodium acid sulfate monohydrate is also dissolved, and the total mix is then evaporated to yield a crop of mixed crystals containing both acid salts.

When dissolved at 0.227 Kg. active per 400 liters, solution is complete and free from hydrolysis, with a pH of 2.96.

This composition provides excellent preventive and curative control of both apple scab incited by *Venturia inaequalis* and powdery mildew incited by *Podosphaera leucotricha*.

2-Benzimidazolecarbamic acid, ethyl ester may be substituted for the 2-benzimidazolecarbamic acid, methyl ester in the above example with like results.

Example 8

| | |
|---|---|
| 2-benzimidazolecarbamic acid, methyl ester (1-1) adduct with $HNO_3$ | 35.8% |
| Maleic acid | 64.2% |

The above components are blended and hammer-milled to give a water-soluble powder. When dissolved in water at a rate of 0.0568 Kg. active per 400 liters, (approximately 150 ppm) the solution is free from hydrolysis and the pH is 2.92.

The above solution is diluted to 80 ppm, 16 ppm and 3.2 ppm with water preacidified with maleic acid to prevent hydrolysis. A curative test is then conducted on greenhouse grown apple seedings. In this test, plants inoculated with conidia of *Venturia inaequalis* are incubated 48 hours before spraying. Effective treatments must eradicate established disease (i.e., cure the plants). Results are as follows:

| Active Concentration | Percent Control of Disease | | |
|---|---|---|---|
| | 80 ppm | 16 ppm | 3.2 ppm |
| 2-benzimidazolecarbamic acid, methyl ester, nitrate | 99.7 | 100 | 4 |

Example 9

| | |
|---|---|
| 2-benzimidazolecarbamic acid, methyl ester, bisulfate | 25% |
| p-toluenesulfonic acid | 25% |
| diatomaceous silica | |

Example 9-Continued

| | |
|---|---|
| ("Celite" 209) (inert anti-caking diluent) | 50% |

The above components are mixed and hammer-milled. When added to water at a rate of 0.114 Kg. active per 400 liters, this mix is marked by a very rapid solution rate. pH of solution is 2.92.

Examples of Acidified Tank Mixtures

Example 10

| | |
|---|---|
| 2-benzimidazolecarbamic acid, methyl ester, hydrochloride dihydrate | 80 ppm |
| water acidified with HCl to pH 2.5 | |

Water is first adjusted to pH 2.5 with HCl, then the active compound is dissolved.

Dilutions from 80 ppm to 16 ppm and 3.2 ppm are prepared for a greenhouse disease control test. The solution of the hydrochloride described above is diluted to the lower concentrations with acidified water at pH 2.5 to insure that hydrolysis will not occur due to pH rise with dilution. The resulting dilutions are sprayed on cucumber plants which are subsequently inoculated with the powdery mildew fungus, *Erysiphe cichoracearum*.

Under these conditions the following results are obtained:

| Active Concentration | Percent Control of Disease | | |
|---|---|---|---|
| | 80 ppm | 16 ppm | 3.2 ppm |
| 2-benzimidazolecarbamic acid, methyl ester hydrochloride dihydrate in water at pH 2.5 | 98 | 87 | 50 |

EXAMPLE 11

The compound 2-benzimidazolecarbamic acid, methyl ester is tank mixed at 80 ppm with an equimolar amount (80 ppm) of citric acid. The benzimidazole does not go into solution and the pH is 3.90.

This slurry is sprayed on young cucumber plants in a powdery mildew preventive test along with greater dilutions. As the water evaporates on the foliage of the plants, the citric acid salt of 2-benzimidazolecarbamic acid, methyl ester is formed. The 80 ppm treatment gives good control of the powdery mildew fungus, *Erysiphe cichoracearum*. The results are as follows:

| | Percent Disease Control | | |
|---|---|---|---|
| Active Concentration = | 80 ppm | 16 ppm | 3.2 ppm |
| | 90 | 9 | 1 |

Examples of Solution of Acid Salt Stabilized Against Precipitation by Surfactant at pH near Neutrality Example 12

| | |
|---|---|
| 2-benzimidazolecarbamic acid, methyl ester, hydrochloride | |

Example 12-Continued

| | |
|---|---|
| dihydrate | 80 ppm in water |
| "Marasperse" CB (partially desulfonated ligninsulfonate) | 250 ppm |

The above tank mix preparation is made by first dissolving the active hydrochloride in a small amount of acidified water, adding this to a larger volume of "Marasperse" CB solution and then adjusting the pH to 6.8 with NaOH. In the presence of Marasperse CB no separation of solid appears at this pH even after 24 hours' standing.

In greenhouse tests, dilution to lower levels of active are made with water containing Marasperse CB at 250 ppm so that the concentration of this component remains unchanged.

This composition is examined for activity in an apple scab preventive test conducted in the greenhouse against *Venturia inaequalis* with the following results:

| Active Concentration | Percent Control of Disease | | |
|---|---|---|---|
| | 80 ppm | 16 ppm | 3.2 ppm |
| 2-benzimidazolecarbamic acid, methyl ester hydrochloride dihydrate in "Marasperse" CB solution at pH 6.8 | 95 | 90 | 53 |

EXAMPLE 13

Solutions of 2-benzimidazolecarbamic acid, methyl ester in acetic acid:

A. 20 parts of 2-benzimidazolecarbamic acid, methyl ester are dissolved in 500 parts glacial acetic acid.

B. 250 parts of a polyhydric alcohol ester are dissolved in 1 million parts of water.

The acetic acid solution (A) is diluted with 250,000 parts of surfactant solution (B) to give a solution containing 80 ppm active fungicide, pH = 3.3.

50,000 Parts of the above solution is diluted with 200,000 parts surfactant solution (B) to give a solution containing 16 ppm active fungicide, pH = 3.58.

50,000 Parts of the 16 ppm solution is diluted with 200,000 parts surfactant solution (B) to give a third mix containing 3.2 ppm active, pH = 4.01.

None of these solutions show evidence of separation of insoluble crystals prior to application, but the solutions slowly hydrolyze to give the insoluble ester.

These solutions are tested for fungus disease control activity by spraying sugar beet plants and later inoculating with the leaf spot fungus *Cercospora beticola*. The results are as follows:

| Active Concentration | Percent Control of Disease | | |
|---|---|---|---|
| | 80 ppm | 16 ppm | 3.2 ppm |
| Acetic acid solution of 2-benzimidazolecarbamic acid, methyl ester in surfactant-water | 99.9 | 99.9 | 82 |

Example 14

| | |
|---|---|
| Mixed crystals of 2-benzimidazole- | 55.6% |

Example 14-Continued

| | |
|---|---|
| carbamic acid, methyl ester acid sulfate and NaHSO$_4$.H$_2$O 90:10 ratio | |
| Low viscosity methylcellulose | 3.0% |
| Neutral synthetic fine silica | 41.4% |

The above components are mixed and micropulverized to yield a flowable, non-caking powder. Upon mixing with water, only the silica remains undissolved. The methylcellulose contains about 26 to 33 percent methoxyl, and its 2 percent solution has a viscosity of approximately 15 centipoise.

This composition provides excellent preventive and curative control of both apple scab incited by *Venturia inaequalis* and powdery mildew incited by *Podosphaera leucotricha*.

EXAMPLE 15

Preparation of methyl 2-benzimidazolecarbamate hydrochloride monohydrate

A solution of concentrated hydrochloric acid (5 parts) in acetone (245 parts) is added to a slurry of methyl 2-benzimidazolecarbamate (9.5 parts) in acetone (100 parts) and the mixture is refluxed for three hours.

Filtration of the cold reaction mixture and drying of the residual solid at room temperature under vacuum yields methyl 2-benzimidazolecarbamate hydrochloride monohydrate (11.1 parts), m.p. 169°–171°C.(dec.).

This salt, which is soluble and moderately stable in aqueous acetone solutions, recrystallizes from acetone as colorless crystals, m.p. 170°–173°C.(dec.).

| | |
|---|---|
| Found: | C, 44.18; H, 4.85; N, 16.88; Cl 14.12% |
| Required (for monohydrate): | C, 44.08; H, 4.89; N, 17.14; Cl 14.49% |

EXAMPLE 16

One hundred parts of methyl 2-benzimidazolecarbamate and 210 parts of ferric nitrate nonahydrate are placed in 600 parts of methanol or water and heated for 2 hours. If water is used, the mixture is heated to 80°C. and if methanol, the mixture is heated to reflux. The mixture is filtered while still warm to remove a small amount of insoluble material, and the filtrate is then evaporated to dryness to give 148 parts of brown solid.

Twenty-five kilograms of the brown solid is dissolved in 200 l. of water, and sprayed over a 45 cm. band covering 9,000 meters of row. The material is incorporated into the band by rotovation. Cottonseed, pretreated with 400 grams of Arasan [bis(dimethylthiocarbamoyl)disulfide] per 100 kg. of machine-delinted seed, is planted in furrows prepared in these bands. The plants in the treated area emerge to form an excellent stand, grow vigorously throughout the season, and produce a high yield of cotton fiber. Plants in an adjacent area, similar in all respects except for treatment with the compound of this invention, emerge to form an excellent stand and grow vigorously for a considerable time, but then begin to show effects of an attack upon their vascular system by *Verticillium albo-atrum*. The leaves of many of the plants wilt and then drop from the plant. This premature defoliation of the plants coupled with damage to the rest of the vascular system drastically reduces yields of cotton in the untreated area.

EXAMPLE 17

A composition is prepared by grinding together 371 parts of the brown solid obtained in Example 16 with 3,100 parts of ferric nitrate nonahydrate and blending the mixture until it is uniform.

Ninety kilograms of this solid is spread evenly in a 45 cm. band over 9,000 meters of row. The material is tilled into the soil and cotton is planted in a furrow prepared in the band. Normal cultural practices are followed. Damping off is controlled by seed treatment, and early and late season insects by proper application of insecticide. An area similar in all respects to the first except for application of the material of this invention is also applied to cotton. The plants in this untreated area germinate well and grow vigorously until mid-season when they show signs of wilting followed by defoliation. These diseased plants produce a small yield of fiber. The plants from the treated area show excellent germination and growth, are much darker green in color, and go on to produce an excellent yield of cotton.

EXAMPLE 18

A composition is prepared by following the instructions set forth in Example 16 substituting 80 parts of ferric chloride for the 210 parts of ferric nitrate nonahydrate of that Example.

| | |
|---|---|
| Composition described above | 10.0% |
| Vermiculite granules (15–30 mesh) | 80.0% |
| Calcium lignin sulfonate | 10.0% |

The active ingredient and the calcium lignin sulfonate are ground to pass a 0.30 mm. screen and then tumbled with the preformed granules while being sprayed with sufficient water to cause adherence of the active to the granule. The composition is then dried.

The resulting granules are applied broadcast during the disking operation at the rate of 300 kg./ha. Tomato plants are set out 60 cm. apart in 1 m. rows. The plants grow well and produce a high yield. Plants in adjacent untreated fields grow well initially, but many succumb to infection by Verticillium sp., and yields from these areas are poor.

We claim:

1. A method of controlling fungi comprising applying to the locus to be protected a fungicidally effective non-phytotoxic amount of a fungicidal composition consisting essentially of a compound of the formula:

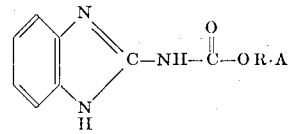

wherein
R is methyl or ethyl and
A is an acid having an ionization constant greater than $1 \times 10^{-6}$ with additional acid having an ionization constant greater than $10^{-6}$ such that the composition at spray concentration has a pH of 4 or less.

2. A method of controlling fungi comprising applying to the locus to be protected a fungicidally effective non-phytotoxic amount of 2-benzimidazolecarbamic acid, methyl ester as the acid sulfate with additional acid having an ionization constant greater than $1 \times 10^{-6}$ such that the composition has a spray concentration pH of 3.2 or less.

3. A method of controlling fungi comprising applying to the locus to be protected a fungicidally effective nonphytotoxic amount of a fungicidal composition consisting essentially of a compound of the formula

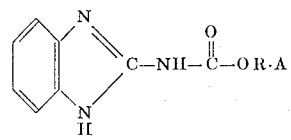

wherein A is an acid having an ionization constant greater than $1 \times 10^{-6}$ with an additional acid having an ionization constant greater than $1 \times 10^6$ such that the composition at spray concentration has a pH of 4 or less.

4. The method of claim 4 wherein A is hydrochloric acid and the additional acid has an ionization constant greater than $1 \times 10^{-3}$.

5. The method of claim 4 wherein the spray concentration has a pH of 3.2 or less.

* * * * *